United States Patent
Ho et al.

(10) Patent No.: US 10,853,804 B1
(45) Date of Patent: Dec. 1, 2020

(54) DYNAMIC TRANSACTION TOKEN/DYNAMIC PRICING BASED ON CONDITIONS OF ORDER

(71) Applicant: Wells Fargo Bank, N.A., San Francisco, CA (US)

(72) Inventors: Peter Ho, Walnut Creek, CA (US); Steve Goldyak, Daly City, CA (US); Sudipta Nadkarni Kitsis, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 1202 days.

(21) Appl. No.: 15/136,490

(22) Filed: Apr. 22, 2016

(51) Int. Cl.
*G06Q 20/38* (2012.01)
*G06Q 30/06* (2012.01)
*G06Q 20/40* (2012.01)
*G06Q 40/00* (2012.01)

(52) U.S. Cl.
CPC ......... *G06Q 20/385* (2013.01); *G06Q 20/405* (2013.01); *G06Q 30/0635* (2013.01)

(58) Field of Classification Search
USPC .......................................................... 705/26
See application file for complete search history.

(56) References Cited

U.S. PATENT DOCUMENTS

| | | | |
|---|---|---|---|
| 5,644,727 A | 7/1997 | Atkins | |
| 5,852,811 A | 12/1998 | Atkins | |
| 5,875,437 A | 2/1999 | Atkins | |
| 6,108,641 A | 8/2000 | Kenna et al. | |
| 6,606,606 B2 | 8/2003 | Starr | |
| 7,536,350 B1 | 5/2009 | Bent et al. | |
| 8,204,809 B1 | 6/2012 | Wise | |
| 8,682,802 B1 | 3/2014 | Kannanari | |
| 2002/0095386 A1 | 7/2002 | Maritzen et al. | |
| 2002/0128912 A1 | 9/2002 | Vindeby | |
| 2004/0073688 A1 | 4/2004 | Sampson | |
| 2006/0064378 A1 | 3/2006 | Clementz et al. | |
| 2007/0174189 A1 | 7/2007 | Bishop et al. | |
| 2007/0192216 A1 | 8/2007 | Arnold et al. | |
| 2007/0198406 A1 | 8/2007 | Bishop et al. | |
| 2008/0140562 A1 | 6/2008 | Kerdachi | |
| 2009/0076956 A1 | 3/2009 | Bishop et al. | |

(Continued)

OTHER PUBLICATIONS

Amazon Payments, retrieved from: http://www.amazon.com/gp/help/customer/display.html/ref=xm_1161282_cont_home?nodeId=1161282.

(Continued)

*Primary Examiner* — Garcia Ade
(74) *Attorney, Agent, or Firm* — Foley & Lardner LLP

(57) ABSTRACT

A computer-implemented method includes receiving an order for a good or service. The order includes a plurality of order conditions. A plurality of limited-use payment tokens are provisioned. Each of the limited use payment tokens are structured to expire according to one of the plurality of order conditions. An indication of completion of the order is received upon completion of the order. An indication of conditions of the completed order is also received. It is determined whether each of the limited-use payment tokens are expired, based on the conditions of the completed order. A payment is transmitted to a recipient. The payment corresponds to at least one of the non-expired limited-use payment tokens.

8 Claims, 4 Drawing Sheets

(56) References Cited

U.S. PATENT DOCUMENTS

| | | |
|---|---|---|
| 2009/0076957 A1 | 3/2009 | Bishop et al. |
| 2009/0083181 A1 | 3/2009 | Bishop et al. |
| 2009/0157518 A1 | 6/2009 | Bishop et al. |
| 2009/0187482 A1 | 7/2009 | Blount et al. |
| 2010/0169236 A1 | 7/2010 | Bregstein et al. |
| 2010/0241545 A1 | 9/2010 | O'Connor et al. |
| 2011/0010289 A1 | 1/2011 | Kranzley |
| 2011/0289006 A1 | 11/2011 | Hutchison et al. |
| 2012/0271770 A1* | 10/2012 | Harris ............. G06Q 40/00 705/67 |
| 2012/0303498 A1 | 11/2012 | Cova et al. |
| 2013/0290187 A1 | 10/2013 | Itwaru |
| 2014/0207668 A1 | 7/2014 | Hermansen et al. |
| 2014/0229375 A1* | 8/2014 | Zaytzsev ......... G06Q 20/36 705/44 |
| 2014/0279475 A1 | 9/2014 | Castrechini et al. |
| 2014/0379562 A1 | 12/2014 | Olson et al. |
| 2015/0113609 A1 | 4/2015 | Joyce et al. |
| 2015/0120546 A1 | 4/2015 | Fernandes |
| 2015/0149352 A1 | 5/2015 | Nichols et al. |
| 2016/0330027 A1 | 11/2016 | Ebrahimi |
| 2016/0335633 A1 | 11/2016 | Joyce et al. |
| 2017/0109715 A1 | 4/2017 | Aguirre et al. |
| 2017/0132615 A1 | 5/2017 | Castinado et al. |
| 2017/0132630 A1 | 5/2017 | Castinado et al. |
| 2017/0147975 A1 | 5/2017 | Natarajan et al. |

OTHER PUBLICATIONS

Yeung, K., � FFD01CBanking startup Clearbanc launches with a new instant pay tool for Uber drivers, � FFD01D Business, retrieved from: http://www.venturebeat.com/2015/10/15/banking-startup-clearbanc-launcheswith-a-new-instant-pay-tool-for-uber-drivers/ , 5 pages (Oct. 15, 2015).

Crowe et al., Is Payment Tokenization Ready for Primetime?, Jun. 11, 2015, Federal Reserve Bank of Atlanta, 51 pages.

\* cited by examiner

202

| LUT | TIME | VALUE |
|---|---|---|
| 1 | 30 MINS | $25 |
| 2 | 40 MINS | $20 |
| 3 | ∞ | $15 |

| LUT | TIME | VALUE |
|---|---|---|
| 1 | 30 MINS | $5 |
| 2 | 40 MINS | $5 |
| 3 | ∞ | $15 |

| LUT | TIME | VALUE |
|---|---|---|
| 1 | 0 MINS | $25 |
| 2 | 30 MINS | $-5 |
| 3 | 40 MINS | $-5 |

Fig. 2C

DYNAMIC TRANSACTION TOKEN/DYNAMIC PRICING BASED ON CONDITIONS OF ORDER

TECHNICAL FIELD

The present disclosure relates generally to the field of tokenized payments.

BACKGROUND

Tokenization is the process of substituting a sensitive data element with a non-sensitive surrogate value, referred to as a token, that has no extrinsic or exploitable meaning or value. The token is a reference (e.g., identifier) that maps back to the sensitive data through a tokenization system. Payment tokens are surrogate values that replace a user's (e.g., cardholder's) primary account number ("PAN") associated with a payment card, such as a credit card, debit card, stored value card, etc. A payment token may be transmitted to a recipient in lieu of a PAN to complete a payment transaction. Payment tokens provide enhanced security in connection with payment transactions. For example, payment tokens may be restricted to use with only certain merchants or payment channels. In addition, payment tokens may be unlinked from the PAN if the token is no longer needed or if a payment device is lost or stolen.

SUMMARY

According to an example embodiment, a computer-implemented method includes receiving an order for a good or service. The order includes a plurality of order conditions. A plurality of limited-use payment tokens are provisioned. Each of the limited use payment tokens are structured to expire according to one of the plurality of order conditions. An indication of completion of the order is received upon completion of the order. An indication of conditions of the completed order is also received. It is determined whether each of the limited-use payment tokens are expired, based on the conditions of the completed order. A payment is transmitted to a recipient. The payment corresponds to at least one of the non-expired limited-use payment tokens.

According to another example embodiment, a system includes a server system. The server system includes a processor and instructions stored in non-transitory machine-readable media. The instructions are configured to cause the server system to receive an order for a good or service. The order includes a plurality of order conditions. A plurality of limited-use payment tokens are provisioned. Each of the limited use payment tokens are structured to expire according to one of the plurality of order conditions. An indication of completion of the order is received upon completion of the order. An indication of conditions of the completed order is also received. It is determined whether each of the limited-use payment tokens are expired, based on the conditions of the completed order. A payment is transmitted to a recipient. The payment corresponds to at least one of the non-expired limited-use payment tokens.

According to another example embodiment, a computer-implemented method includes receiving a transaction authorization request. The transaction authorization request includes a plurality of transaction conditions. The transaction authorization request relates to a request for a payment from a user's payment account to a recipient. A plurality of limited-use payment tokens are provisioned. Each of the limited use payment tokens are structured to expire according to one of the transaction conditions. Upon completion of the transaction, at least one of the plurality of limited-use payment tokens is received. A payment corresponding to the received at least one limited-use payment token is transmitted to the recipient.

According to another example embodiment, a system includes a server system. The server system includes a processor and instructions stored in non-transitory machine-readable media. The instructions are configured to cause the server system to receive a transaction authorization request. The transaction authorization request includes a plurality of transaction conditions. The transaction authorization request relates to a request for a payment from a user's payment account to a recipient. A plurality of limited-use payment tokens are provisioned. Each of the limited use payment tokens are structured to expire according to one of the transaction conditions. Upon completion of the transaction, at least one of the plurality of limited-use payment tokens is received. A payment corresponding to the received at least one limited-use payment token is transmitted to the recipient.

According to another example embodiment, a computer-implemented method includes receiving an order for a good or service. The order includes a plurality of order conditions. A request for a plurality of limited-use payment tokens is transmitted. The request includes the plurality of order conditions. The plurality of limited-use payment tokens are received. Each of the limited use payment tokens are structured to expire according to one of the plurality of order conditions. An indication of completion of the order, and an indication of conditions of the completed order are received. It is determined, based on the conditions of the completed order, whether each of the limited-use payment tokens are expired. At least one of the non-expired limited-use payment tokens are transmitted to a payment network.

According to another example embodiment, a system includes a server system. The server system includes a processor and instructions stored in non-transitory machine-readable media. The instructions are configured to cause the server system to receive an order for a good or service. The order includes a plurality of order conditions. A request for a plurality of limited-use payment tokens is transmitted. The request includes the plurality of order conditions. The plurality of limited-use payment tokens are received. Each of the limited use payment tokens are structured to expire according to one of the plurality of order conditions. An indication of completion of the order, and an indication of conditions of the completed order are received. It is determined, based on the conditions of the completed order, whether each of the limited-use payment tokens are expired. At least one of the non-expired limited-use payment tokens are transmitted to a payment network.

These and other features, together with the organization and manner of operation thereof, will become apparent from the following detailed description when taken in conjunction with the accompanying drawings, wherein like elements have like numerals throughout the several drawings described below.

BRIEF DESCRIPTION OF THE FIGURES

FIGS. 2A-2C are tables illustrating limited-use payment token configurations, according to example embodiments.

DETAILED DESCRIPTION

Figure 1:
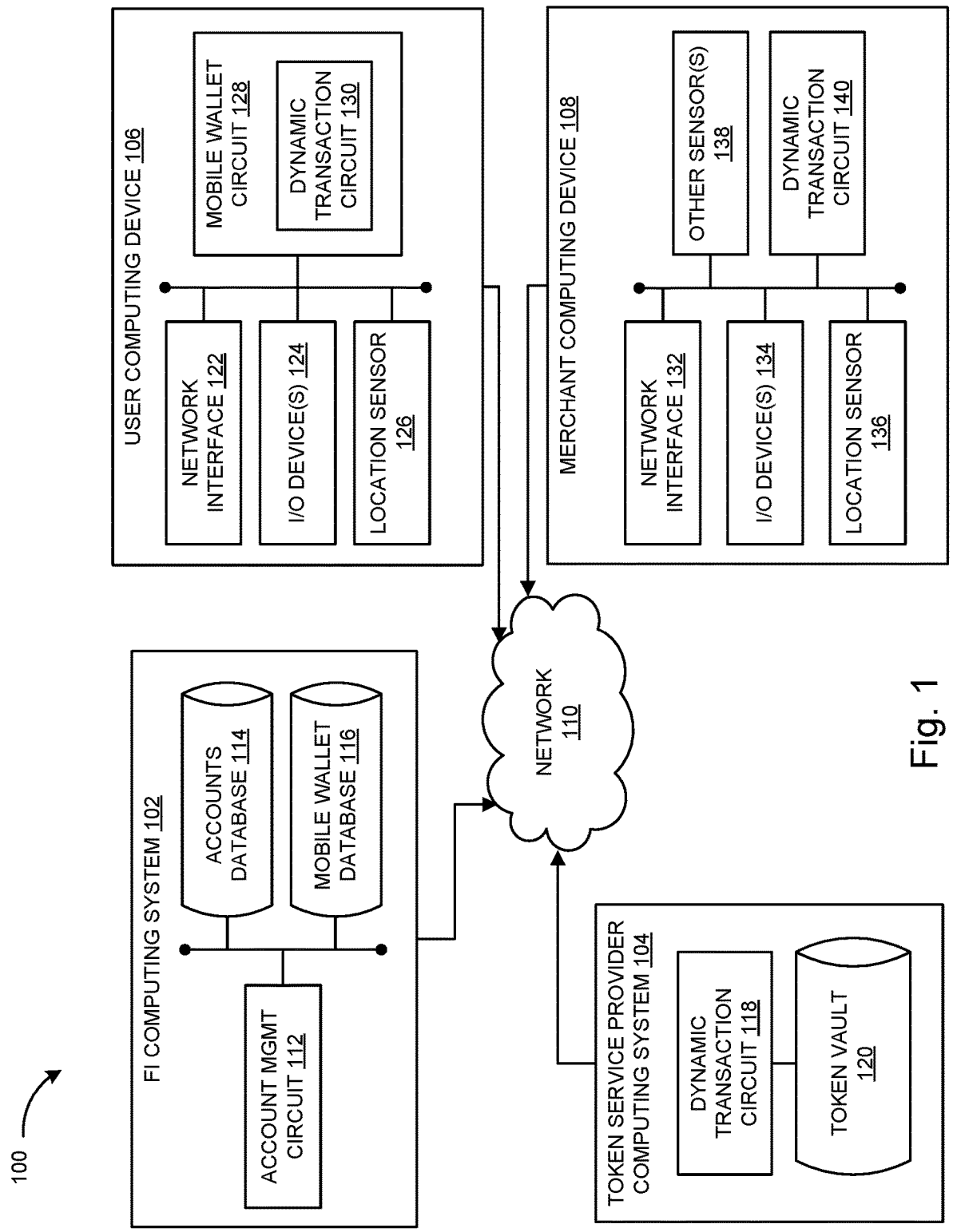
FIG. 1 is a block diagram of a computer-implemented payment processing system, according to an example embodiment.

Referring generally to the figures, various embodiments relate to systems and methods for facilitating transactions using dynamic transaction tokens. In one example embodiment, a plurality of limited-use payment tokens (LUTs) are provisioned to be utilized in connection with a single payment transaction. Each of the LUTs may be associated with a condition of the payment transaction. For example, in one embodiment, each of the LUTs may be structured to expire upon occurrence of the corresponding condition. Upon performance (e.g., delivery), the one or more non-expired LUTs are used to complete the transaction. For example, in one embodiment, only the highest-value, non-expired LUT is used to complete the transaction. In another embodiment, all of the LUTs are used to complete the transaction, and the amount paid is the sum value of the non-expired LUTs. The LUTs provided in connection with a single payment transaction may correspond to different payment amounts. Accordingly, in some embodiments, a plurality of LUTs may be employed to provide dynamic pricing for a transaction. For example, the plurality of LUTs may be used for dynamic transaction pricing in which the amount that is paid depends on certain conditions being met in the delivery, quality, etc. of goods or services.

In some example embodiments, the LUTs are structured in a similar manner as conventional payment tokens. Accordingly, the LUTs include a tokenized PAN. The payment amount and conditions may be defined in various data fields of the token, such as within the "PaymentData" or "Reserved" data fields, or other data fields. In other example embodiments, the LUTs do not include a tokenized PAN. Instead, the LUTs define the conditions of a transaction and are used along with a payment token to complete a transaction. Accordingly, although the LUTs are described as being payment tokens, it should be understood that LUTs need not include an account number (e.g., PAN), or any representation thereof (e.g., a tokenized PAN), associated with the transaction.

Example embodiments utilize cryptographic keys to securely exchange the LUTs between the token service provider, the merchant, and the user. Embodiments may use any of various cryptographic key protocols, such as Diffie-Hellman key exchange, RSA, etc. In one example embodiment, the token service provider holds private keys and each of the user and the merchant hold a public key associated with each private key. The private keys held by the token service provider may be utilized to decrypt LUTs signed by each of the user and the merchant, using their respective public keys.

Embodiments described herein solve technical problems associated with computer-based and internet-based systems, such as computing device-based mobile wallet payment systems, and particularly, with enabling automated dynamic pricing for transactions via mobile wallet payment platforms using tokenization. The problem arises out of the use of computers and the internet because payments from mobile wallet payment platforms are processed using online banking systems and backend computer-based payment processing systems. Embodiments described herein solve these technical problems by facilitating payment transactions using a plurality of LUTs in connection with a single payment transaction to provide dynamic pricing based on conditions of the transaction. The analysis of selecting the particular LUTs to utilize to complete the transaction may be initiated via operative communication between user and merchant computing devices. Accordingly, embodiments described herein provide seamless, automated dynamic pricing through the use of payment tokens, and specifically, through the use of a plurality of LUTs.

In addition, embodiments described herein provide enhanced trust between the user and the merchant regarding the payment amount of a dynamic transaction. For example, in some embodiments, both parties are involved in determining the LUT to be used for a transaction, and therefore, in determining the payment amount of the dynamic payment transaction. Some embodiments require that the LUTs are signed by both the merchant and the user, and the transaction is completed only if the user and the merchant select the same LUT. Accordingly, instead of only one party deciding the payment amount of a dynamic payment transaction, both parties must mutually agree on the payment amount by signing the LUTs to be used in the transaction. Thus, embodiments described herein provide enhanced control over the payment amount of dynamic payment transactions.

Referring to FIG. 1, a block diagram of a computer-implemented payment processing system 100 is illustrated, according to an example embodiment. The payment processing system 100 may include, among other devices and systems, an FI computing system 102, a token service provider computing system 104, a user computing device 106, and a merchant computing device 108. The various systems and devices may communicate through a network 110, which may include one or more of the Internet, cellular network, Wi-Fi, Wi-Max, a proprietary banking network, or any other type of wired or wireless network.

The payment processing system 100 may be used to facilitate payment transactions between entities, such as between a user (e.g., via the user computing device 106) and a merchant (e.g., via the merchant computing device 108). The payment transactions may be dynamic payment transactions in which the payment amount is contingent on various conditions associated with the transaction being met, such as delivery time or other factors. In some embodiments, the token service provider 104 is configured to provision a plurality of LUTs in connection with a single transaction, with each of the LUTs being associated with a condition of the payment transaction. Accordingly, the payment amount may be defined based on the value of one or more of the non-expired LUTs.

The FI computing system 102 includes an account management circuit 112, an accounts database 114, and a mobile wallet database 116. The account management circuit 112 is structured to manage financial accounts (e.g., demand deposit accounts, credit or debit card accounts, brokerage accounts, etc.) of various users. Information regarding the users' financial accounts is stored in the accounts database 114. For example, financial account information may include user authentication information (e.g., username/password combinations, device authentication tokens, security question answers, etc.), account balances, transaction history, etc. Users may access their accounts through a mobile wallet, which is also managed by the account management circuit 112. Information regarding the users' mobile wallet accounts is stored in the mobile wallet database 116. For example, mobile wallet account information may include stored credit card information, payment tokens (e.g., LUTs), etc.

The token service provider computing system 104 includes a dynamic transaction token circuit 118 and a token vault 120. The dynamic transaction token circuit 118 is structured to manage payment tokens, such as LUTs, that are generated and provisioned in connection with payment transactions. The payment tokens (e.g., LUTs) may be stored in the token vault 120. As will be appreciated, the token service provider computing system 104 may be managed by various entities, according to various example embodiments. For example, in one embodiment, the token service provider computing system 104 is managed by a payment network (not shown). In another embodiment, the token service provider computing system is managed by an acquirer/processor (not shown). In another embodiment, the token service provider computing system is managed by the FI computing system 102.

The FI computing system 102 and the token service provider computing system 104 may each include a computing system (e.g., one or more servers each with one or more processing circuits), each including a processor and memory. The processors may be implemented as application specific integrated circuits (ASICs), one or more field programmable gate arrays (FPGAs), a group of processing components, or other suitable electronic processing components. The memory may be one or more devices (e.g., RAM, ROM, Flash memory, hard disk storage, etc.) for storing data and/or computer code for completing and/or facilitating the various processes described herein. The memory may be or include non-transient volatile memory, non-volatile memory, and/or non-transitory computer storage media. The memory may include data base components, object code components, script components, or any other type of information structure for supporting the various activities and information structures described herein. The memory may be communicably connected to the processor and include computer code or instructions for executing one or more processes described herein. The FI computing system 102 and the token service provider computing system 104 may each include server-based computing systems, for example, comprising one or more networked computer servers that are programmed to perform the operations described herein. In another example, the FI computing system 102 and the token service provider computing system 104 may each be implemented as a distributed computing system where each function is spread over multiple computing systems. In addition, the FI computing system 102 and the token service provider computing system 104 may each include a network interface to facilitate communication over the network 110.

The user computing device 106 is a computing device associated with a user who is an account holder of the FI that manages the FI computing system 102. The user computing device 106 may be a mobile device (a smartphone, a wearable computing device such as eyewear, a tablet, a portable gaming device, etc.), a laptop or desktop computer, a smart payment card, etc.

The user computing device 106 includes a network interface 122, one or more I/O devices 124, and a location sensor 126. The network interface 122 may include program logic that facilitates operative communication between the user computing device 106 and other systems (e.g., the FI computing system 102) and devices (e.g., the merchant computing device 108), either directly or via the network 110. For example, the network interface 122 may include any of various types of wireless network transceivers (e.g., 802.11X, Bluetooth, NFC, Bluetooth Low Energy (BLE), RFID, ZigBee, etc.), cellular transceivers (e.g., CDMA, GSM, LTE, etc.), or a combination thereof (e.g., both a cellular transceiver and a Bluetooth transceiver).

The one or more I/O devices 124 may include any of display or touchscreen display devices (e.g., liquid crystal display (LCD), a light-emitting diode (LED) display, or other types of display technologies), keyboards, buttons, microphones, speakers, notification LEDs, sensors, switches, cameras, etc., or any combination thereof. The one or more I/O devices 124 may be utilized to access an online banking website managed by the FI computing system 102, to manage a mobile wallet, to place orders, to monitor order status, to select a tip amount, etc. The location sensor 126 may include a device or circuit (e.g., a GPS device) structured to determine the geolocation of the user computing device 106.

The user computing device 106 includes a mobile wallet circuit 128. The mobile wallet circuit 128 facilitates operation of a mobile wallet, which the user may utilize to conduct payment transactions. The mobile wallet circuit 128 may include a mobile application (e.g., a smartphone application) structured to communicate with the FI computing system 102 and the token service provider computing system 104 via the network 110. The mobile wallet circuit 128 may also be structured to communicate with the merchant computing device 108, either directly or over the network 110. In one example embodiment, the mobile wallet circuit 128 may communicate wirelessly with the merchant computing device 108 through the network interface 110 via a wireless communication protocol. In another example embodiment, the mobile wallet circuit 128 communicates with the merchant computing device 108 by a presenting a barcode (e.g., a two-dimensional or three-dimensional barcode) on the I/O device 124 (e.g., display) of the user computing device 106 that may be scanned by a scanner of the merchant computing device 108. The merchant computing device 108 communicates information received from the mobile wallet circuit 128, e.g., a payment token (e.g., an LUT), to the FI computing system 102 (e.g., via a payment network) for authorization to proceed with the pending transaction.

The mobile wallet circuit 128 may include a dynamic transaction circuit 130 structured to facilitate dynamic payment transactions via one or more LUTs. In some embodiments, the dynamic transaction circuit 130 is structured to request LUTs based on parameters associated with an order. In some embodiments, the dynamic transaction circuit 130 is structured to select one or more LUTs to be used to complete an order, based on detected parameters associated with the order.

The merchant computing device 108 is a computing device that is structured to facilitate a payment transaction via operative communication with the user computing device 106. According to various example embodiments, the merchant computing device 108 may be a standalone device or may be incorporated into another object. For example, in one embodiment, the merchant computing device 108 is a mobile computing device (e.g., smartphone, tablet, portable computer, etc.). In another embodiment, the merchant computing device 108 is incorporated into a delivery vehicle (e.g., a car or truck, an unmanned aerial vehicle (e.g., drone), a self-driving vehicle, etc.). In yet another embodiment, the merchant computing device 108 is incorporated into a product that is the subject of the transaction, or an object associated therewith (e.g., packaging). For example, in one embodiment, the merchant computing device 108 may be a disposable computing device that is incorporated into a box inside which the product is delivered.

The merchant computing device 108 may include a network interface 132, one or more I/O devices 134, a location sensor 136, other sensors 138, and a dynamic transaction circuit 140. The network interface 132, the one or more I/O devices 134, and the location sensor 136 may include structures similar to the network interface 122, the one or more I/O devices 124, and the location sensor 126 described above in connection with the user computing device 106.

The other sensors 138 may include any of various sensors structured to determine conditions associated with an order. For example, the other sensors 138 may include a clock or timer structured to determine a time parameter associated with an order, such as an amount of time elapsed between placing an order and receiving a delivery. In another implementation, the other sensors 138 may include a temperature sensor structured to determine a temperature of a good associated with the order. In yet another implementation, the other sensors 138 may include an accelerometer that measures vibration during shipment. For example, the conditions associated with a shipment of wine may relate to frequency and magnitude of vibration of the wine during transit. In another example, the conditions associated with an order may include the delivery location for the order (e.g., as determined by the location sensor 136). In one implementation, a dynamic payment is associated with a shipping speed. For example, a first price is charged if a package arrives in two days, and a different second price is charged if a package arrives in three days.

The dynamic transaction circuit 140 is structured to facilitate dynamic payment transactions via one or more LUTs. In some embodiments, the dynamic transaction circuit 130 is structured to request LUTs based on parameters associated with an order. In some embodiments, the dynamic transaction circuit 130 is structured to select one or more LUTs to be used to complete an order, based on detected parameters associated with the order.

FIGS. 2A-2C are tables illustrating LUT configurations, according to example embodiments. The example embodiments of FIGS. 2A-2C are described in connection with an order for a pizza placed by a user with a pizzeria. In these examples, the pizza costs $25, and the pizzeria has guaranteed that the pizza will be delivered within 30 minutes of placing the order, otherwise the pizza is 20% ($5) off. If the pizza is delivered more than 40 minutes after placing the order, the pizza is 40% ($10) off.

In the configuration 202 of FIG. 2A, the highest-value non-expired LUT is selected and utilized to complete a payment transaction. The particular LUT may be selected by any of the FI computing system 102, user computing device 106, the merchant computing device 108, or other systems or devices. For example, if the pizza is delivered within 30 minutes of placing the order, LUT 1, which has a value of $25 (the full cost of the pizza) will be utilized to complete the order. LUT 1 is utilized because none of the LUTs are expired, and LUT 1 is the highest-value non-expired token. If the pizza is delivered between 30-40 minutes of placing the order, LUT 2, which has a value of $20 (20% off of the full cost of the pizza) will be utilized to complete the order. LUT 1 will have expired 30 minutes after placing the order. Therefore, LUT 2 is the highest-value non-expired token. If the pizza is delivered more than 40 minutes after placing the order, LUT 3, which has a value of $15 (40% off of the full cost of the pizza) will be utilized to complete the order. LUT 2 will have expired 40 minutes after placing the order. Therefore, LUT 3 is the highest-value non-expired token.

In the configuration 204 of FIG. 2B, all of the non-expired LUTs are utilized to complete a payment transaction, and the transaction amount is the sum value of the non-expired LUTs. For example, if the pizza is delivered within 30 minutes of placing the order, none of the LUTs will be expired, and therefore, all of the LUTs will be utilized to complete the order. The payment amount will be $25, which is the sum of LUT 1 ($5), LUT 2 ($5), and LUT 3 ($15). If the pizza is delivered between 30-40 minutes of placing the order, LUT 1 will have expired, and therefore, LUT 2 and LUT 3 will be utilized to complete the order. The payment amount will be $20, which is the sum of LUT 2 ($5), and LUT 3 ($15). If the pizza is delivered more than 40 minutes after placing the order, LUT 2 and LUT 3 will be expired, and therefore, LUT 3 will be utilized to complete the order. The payment amount will be $15, which is the value of LUT 3. The minimum payment amount that is guaranteed is $15. In some implementations, the FI computing system 102 debits the user's payment account by the value of LUT 3 upon provisioning the tokens. In this case, the merchant is guaranteed to be paid at least the value of LUT 3 ($15).

In the configuration 206 of FIG. 2C, the LUTs are activated, rather than expiring, at the defined times. The transaction amount is the sum value of the activated LUTs. For example, if the pizza is delivered within 30 minutes of placing the order, LUT 1 ($25) will be the only activated LUT. Accordingly, the payment amount will be $25, which is the value of LUT 1. If the pizza is delivered between 30-40 minutes of placing the order, LUT 2 will have been activated, and therefore, LUT 1 and LUT 2 will be utilized to complete the order. The payment amount will be $20, which is the sum of LUT 1 ($25), and LUT 2 ($-5). If the pizza is delivered more than 40 minutes after placing the order, LUT 3 will also have been activated, and therefore, LUT 1, LUT 2, and LUT 3 will all be utilized to complete the order. The payment amount will be $15, which is the sum of LUT 1 ($25), LUT 2 ($-5), and LUT 3 ($-5).

Figure 3:
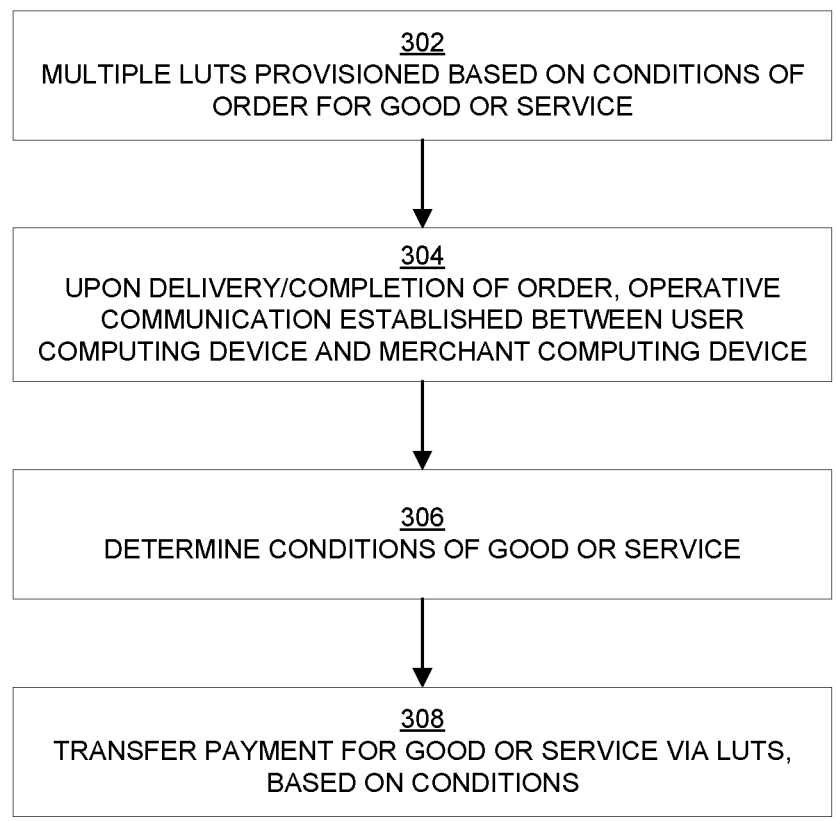
FIG. 3 is a flow diagram of a method of completing a dynamic payment transaction using limited-use payment tokens, according to an example embodiment.

FIG. 3 is a flow diagram of a method 300 of completing a dynamic payment transaction using LUTs, according to an example embodiment. In one embodiment, the method 300 may be performed by the FI computing system 102 of FIG. 1. In other embodiments, the method 300 may be similarly performed by other computing systems or devices. In addition, the method 300 is described in connection with the LUT configuration 202 of FIG. 2A. In particular, as set forth in the example LUT configuration 202 of FIG. 2A, a user has placed an order with a pizzeria for a pizza. The pizza costs $25, and the pizzeria has guaranteed that the pizza will be delivered within 30 minutes of placing the order, otherwise the pizza is 20% ($5) off. If the pizza is delivered more than 40 minutes after placing the order, the pizza is 40% ($10) off. The highest-value, non-expired LUT is utilized to complete the transaction. However, the method 300 may be similarly performed using other LUT configurations.

At 302, multiple LUTs are provisioned based on conditions of an order for a good or service. In this example, LUT 1, LUT 2, and LUT 3 are provisioned based on the conditions of the pizza order. In particular, LUT 1 has a value of $25 and expires 30 minutes after placing the order, LUT 2 has a value of $20 and expires 40 minutes after placing the order, and LUT 3 has a value of $15 and does not expire.

At 304, operative communication is established between the user computing device 106 and the merchant computing device 108 upon completing the order. For example, the order may be considered to have been completed when the pizza is delivered to the user. In one example embodiment, the user computing device 106 and the merchant computing device 108 establish operative communication with each other automatically upon the devices being within a certain radius of each other. In another example embodiment, operative communication is established between the user computing device 106 and the merchant computing device 108 upon the devices being "tapped" against each other (e.g., via NFC communication), or by one of the devices scanning a barcode displayed on the other device.

In other example embodiments, operative communication is established between the merchant computing device 108 and another device (e.g., a beacon) to indicate delivery. In further example embodiments, the merchant computing device 108 may verify completion of the order in other ways, such as by determining, via the location sensor 136, that the geolocation of the merchant computing device 108 matches or is within a predetermined radius of the delivery destination.

At 306, conditions of the good or service are determined. In some example embodiments, the conditions include an amount of time elapsed between the order being placed and the order being delivered. In other example embodiments, the conditions include a physical state (e.g., temperature) of the good (e.g., detected by the other sensor(s) 138 of the merchant device 108).

At 308, payment is transferred for the good or service via the LUTs, based on the conditions of the order. In one example embodiment, the user computing device 106 determines which of the LUTs are expired based on the conditions determined at 306, and transmits the non-expired LUTs to the FI computing system 102 to complete payment of the order. In another example embodiment, the merchant computing device 108 determines which of the LUTs are expired based on the conditions determined at 306, and transmits the non-expired LUTs to the FI computing system 102 to complete payment of the order. In further example embodiments, the FI computing system 102 determines which of the LUTs are expired based on the conditions determined at 306, and completes payment of the order based on the non-expired LUTs.

Figure 4:
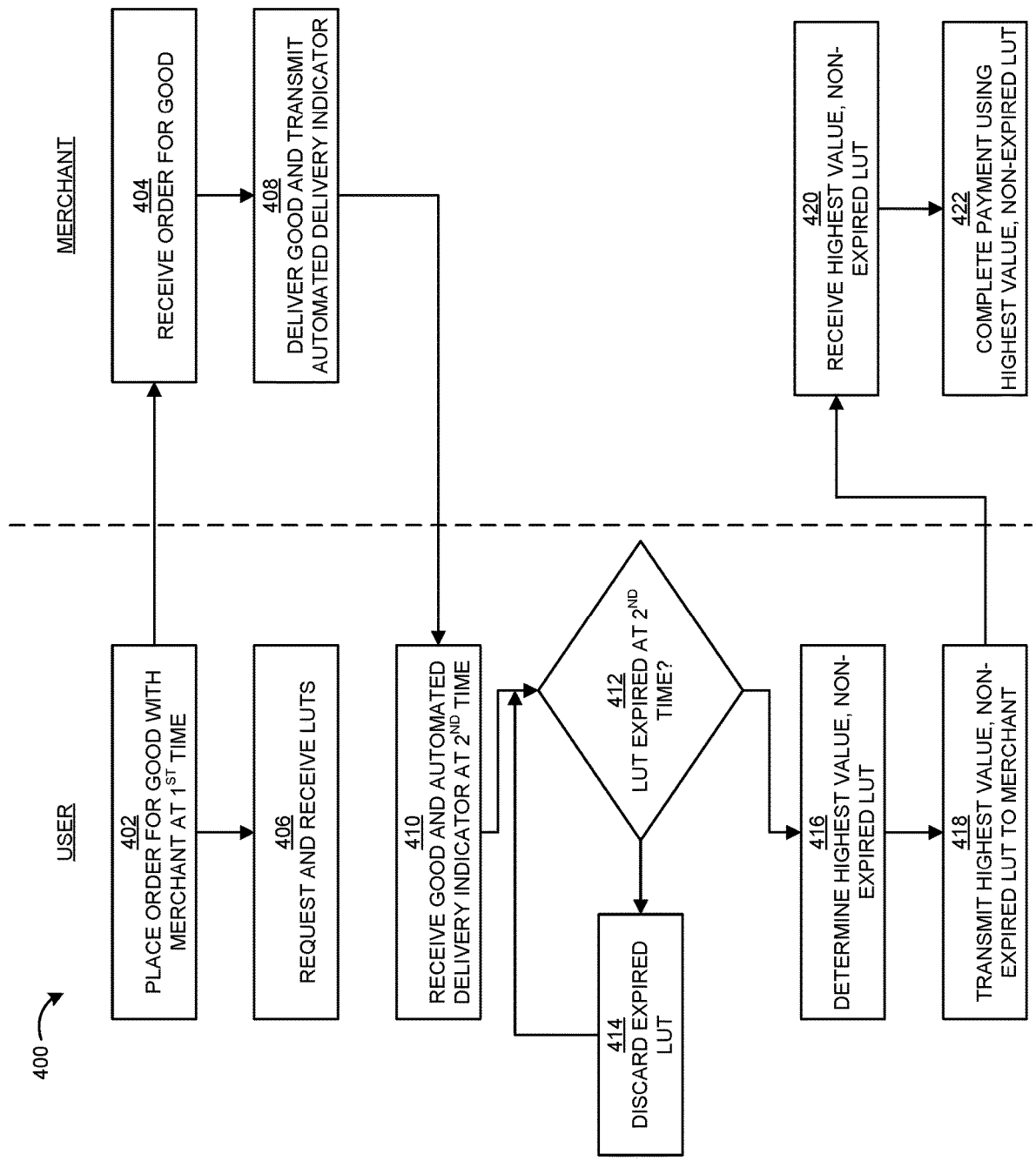
FIG. 4 is a flow diagram of a method of completing a dynamic payment transaction using limited-use payment tokens, according to another example embodiment.

FIG. 4 is a flow diagram of a method 400 of completing a dynamic payment transaction using LUTs, according to an example embodiment. Similar to the method 300, the method 400 is described in connection with the LUT configuration 202 of FIG. 2A. However, the method 400 may be similarly performed using other LUT configurations. In addition, in the method 400, the user computing device 106 (e.g., via the mobile wallet circuit 128 and the dynamic transaction circuit 130) is structured to request and receive the LUTs, and to determine which of the LUTs to use to complete the transaction.

At 402, the user places an order for a good with the merchant at a first time. The user may place the order via a web site or application of the merchant accessed using the user computing device 106 or other devices (e.g., a desktop computer). At 404, the merchant receives the order for the good.

At 406, the user requests and receives LUTs. For example, in one embodiment, the user (e.g., via the user computing device 106) requests LUTs from the FI computing system 102 or from the token service provider computing system 104 upon placing the order with the merchant. Requesting the LUTs includes transmitting conditions of the order, which define the expiration of the LUTs.

At 408, the good is delivered by the merchant to the user, and an automated delivery indicator is transmitted by the merchant (e.g., the merchant computing device 108) to the user (e.g., the user computing device 106). At 410, the user receives the good and the automated delivery indicator at a second time. The automated delivery indicator may be transmitted by establishing operative communication between the merchant computing device 108 and the user computing device 106.

At 414, the user computing device 106 determines whether each of the LUTs are expired. In this example embodiment, the LUTs expire based on the amount of time elapsed between the first time at which the good was ordered and the second time at which the good was delivered. At 414, the expired LUTs are discarded.

At 416, the highest-value, non-expired LUT is determined. At 418, the highest-value, non-expired LUT is transmitted to the merchant. At 420, the highest-value, non-expired LUT is received by the merchant. At 422, payment is completed using the highest-value, non-expired LUT. In some alternative embodiments, steps 414-418 are performed by the merchant instead of the user.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A computer-implemented method performed by a computing system, the method comprising:
   receiving, by the computing system, an order for a good or service, the order including a plurality of order conditions;
   generating, by the computing system, a plurality of limited-use payment tokens based on the plurality of order conditions, wherein each limited-use payment token comprises a monetary value and a defined allowed amount of time between receiving the order and an indication of a completion of the order, the allowed amount of time controlling an expiration of each limited-use payment token;
   provisioning, by the computing system, the plurality of limited-use payment tokens;
   receiving, by the computing system upon a completion of the order, an indication of the completion of the order, and an indication of one or more conditions of the completed order;
   determining, by the computing system based on the one or more conditions of the completed order, a time elapsed between when the order was received and completed;
   comparing, by the computing system, the time elapsed to the allowed amount of time for each limited-use payment token;
   determining, by the computing system, at least one limited-use payment token is expired based on the comparison;
   discarding, by the computing system, the at least one limited-use payment token based on the determination that the at least one limited-use payment token is expired; and transmitting, by the computing system to a recipient, a payment corresponding to the highest monetary value, non-expired limited-use payment tokens.

2. The method of claim 1, wherein a first one of the plurality of limited-use payment tokens relates to a payment for a first value, and a second one of the plurality of limited-use payment tokens relates to a payment for a second value different than the first value.

3. The method of claim 1, wherein the payment corresponding to the highest monetary value, non-expired limited-use payment token further includes a signature agreement between parties of the order for a good or service.

4. The method of claim 1, wherein the payment corresponds to a sum value of a plurality of the non-expired limited-use payment tokens.

5. A system, comprising:
a server system comprising a processor and instructions stored in non-transitory machine-readable media, the instructions configured to cause the server system to:
receive an order for a good or service, the order including a plurality of order conditions;
generate a plurality of limited-use payment tokens based on the plurality of order conditions, wherein each limited-use payment token comprises a monetary value and a defined allowed amount of time between receiving the order and an indication of a completion of the order, the allowed amount of time controlling an expiration of each limited-use payment token;
provision the plurality of limited-use payment tokens;
receive, upon a completion of the order, an indication of the completion of the order, and an indication of one or more conditions of the completed order;
determine, based on the one or more conditions of the completed order, a time elapsed between when the order was received and completed;
compare the time elapsed to the allowed amount of time for each limited-use payment token;
determine at least one limited-use payment token is expired based on the comparison;
discard the at least one limited-use payment token based on the determination that the at least one limited-use payment token is expired; and
transmit, to a recipient, a payment corresponding to the highest monetary value, non-expired limited-use payment tokens.

6. The system of claim 5, wherein a first one of the plurality of limited-use payment tokens relates to a payment for a first value, and a second one of the plurality of limited-use payment tokens relates to a payment for a second value different than the first value.

7. The system of claim 5, wherein the payment corresponding to the highest monetary value, non-expired limited-use payment tokens further includes a signature agreement between parties of the order for the good or service.

8. The system of claim 5, wherein the payment corresponds to a sum value of a plurality of the non-expired limited-use payment tokens.

* * * * *